Patented Oct. 26, 1937

2,096,977

UNITED STATES PATENT OFFICE 2,096,977

PRODUCTION OF CELLULOSE ACETATE AND ANALOGOUS CELLULOSE ESTERS

George A. Richter, Berlin, N. H., assignor to Brown Company, Berlin, N. H., a corporation of Maine No Drawing. Application May 14, 1936, Serial No. 79,746

15 Claims. (Cl. 260—101)

This invention relates to the production of cellulose acetate and analogous cellulose esters and deals more especially with the acetylation of cellulose fiber in the presence of sulphuric acid as the catalyzer of the acetylating reaction.

In producing cellulose acetate, it is customary practice to admix the fiber as uniformly as possible with the acetylating reagent, which consists of a mixture of glacial acetic acid, acetic anhydride, and a suitable catalyzer of acetylation, usually sulphuric acid. It is generally considered that the sulphuric acid plays the part of a dehydrating agent to absorb or abstract the water from the sphere of the acetylating reaction as it is being generated and thus to promote smooth and uniform reaction or that the sulphuric acid forms with the cellulose an addition compound, which is an intermediate in the production of the cellulose acetate. The uniformity with which the sulphuric acid is combined or associated with the individual fibers or fiber walls is thus important, insofar as concerns bringing about the desired reaction; and it is sometimes the case that in catalyzing or promoting the acetylating reaction more sulphuric acid is used than is really desirable, since excess sulphuric acid may undesirably reduce the viscosity of the acetate and otherwise cause trouble. In ordinary practice, according to which acetylation of the fiber is performed by producing very thick mixtures of the fiber with the acetylating reagent, for instance, mixtures containing about 12% to 20% cellulose, based on the weight of the total mixture, it is necessary to employ a heavy-duty mixer and to subject the very thick mixture to long-time mixing action in order to ensure the desired substantially uniform distribution or diffusion of the comparatively involatile and viscous sulphuric acid into the individual fibers or fiber walls.

The present invention makes it possible to distribute with substantial uniformity the desired amount of sulphuric acid in a mass of fiber to be acetylated in that it involves oxidizing sulphur dioxide gas in situ in and throughout the fibrous mass to sulphuric acid. Inasmuch as the distribution is effected in a gaseous phase that completely and substantially uniformly penetrates the body of the fibrous mass, the resulting sulphuric acid is substantially uniformly combined with the individual fibers or fiber walls even when produced in comparatively small amount, wherefore, it becomes feasible to reduce the amount of sulphuric acid from that heretofore used as part of the acetylating mixture, when such reduction is desired, without detracting from the smoothness or uniformity of the acetylating reaction. The ease or speed with which the gases or vapors penetrate a fibrous mass is in direct contrast to the slow rate at which sulphuric acid can be uniformly dispersed throughout the mass; and, in this connection, it might be noted that cellulose fiber has the property of selectively adsorbing sulphur dioxide and other acid gases or vapors on its surface. While various oxidants may be employed to oxidize sulphur dioxide gas in situ in the fibrous mass to sulphuric acid, it is preferable for the purpose herein to avoid those which would leave substantial or undesirable residues in the fiber or the resulting cellulose acetate. Among the oxidizing agents available for the purpose herein might be mentioned such gases as ozone, but I prefer to use concentrated hydrogen peroxide solution on account of the ease and economy with which it may be applied, as will presently appear.

In those instances, when the mass of cellulose fiber is to be activated prior to acetylation by being wetted with a portion of the glacial acetic acid to form part of the acetylating reagent, it is distinctly advantageous to dissolve the sulphur dioxide in such activating acid prior to wetting of the fiber therewith. If desired, the hydrogen peroxide may be dissolved in another portion of activating acid so that, when such other portion is incorporated throughout the mass of fiber already containing the sulphur dioxide distributed therethrough, sulphuric acid will be formed in situ throughout the mass prior to the addition of the rest of the acetylating mixture. On the other hand, the hydrogen peroxide may be added to the remaining glacial acetic acid entering into the acetylating reaction or to the mixture of such remaining glacial acetic acid and acetic anhydride.

I shall now give an example of procedure embodying the present invention, according to which the cellulose fiber is wood pulp and is activated prior to acetylation with glacial acetic acid containing sulphur dioxide dissolved therein. The wood pulp used as raw material, which is preferably of high whiteness, purity, and other appropriate qualities, for instance, of an alpha cellulose content upwards of about 96%, is preferably also of low moisture content, say, about 1%, based on dry weight of fiber; or it may be dried to such low moisture content, if necessary. The fiber in suitable physical form is wetted with glacial acetic acid, for instance, about 20%, based on the dry weight of fiber; and the fiber may then be kept for about 2 to 4 hours at about 40°

C. to acquire the desired activated condition for acetylation. The activated fiber may then be wetted with another portion of glacial acetic acid containing dissolved therein an amount of sulphur dioxide calculated to yield the sulphuric acid content desired in the acetylating reagent. Thus, another 20% portion of glacial acetic acid, based on the dry weight of fiber, containing the requisite amount of sulphur dioxide dissolved therein, may be added to the fiber. It might be noted that sulphur dioxide is very soluble in glacial acetic acid so that there is no difficulty whatever in causing a small amount of such acid to carry the necessary sulphur dioxide into and throughout the fiber mass. The wetting of the activated fiber with the glacial acetic acid solution of sulphur dioxide may, if desired, taken place while the mass of fiber is being mixed or tumbled in a closed vessel, although tumbling action is not essential. Complete distribution or diffusion of the sulphur dioxide throughout the mass takes place rapidly and superatmospheric pressure is not developed in the closed vessel by reason of the fact that the vapor pressure of sulphur dioxide in glacial acetic acid is low. If desired, the sulphur dioxide in gaseous form may be introduced into the fiber mass after the mass has been wet with the activating glacial acetic acid, in which case the gas dissolves in the acetic acid on the fiber. The mass is then wetted with still another portion of glacial acetic acid containing dissolved therein hydrogen peroxide in amount calculated to oxidize the sulphur dioxide distributed throughout the fiber. The hydrogen peroxide-acetic acid mixture also contains the necessary amount of water for such oxidation, which water may be introduced by using aqueous hydrogen peroxide solution of suitable strength, for instance, about 30% strength. Hydrogen peroxide solution of about 30% strength is commercially available and, since it is used in such amount as not to add excessive water to the cellulose, is preferred for admixture with the glacial acetic acid. The oxidation of the sulphur dioxide to sulphuric acid takes place quickly so that after only a short period, the acetic anhydride and the rest of the glacial acetic acid requisite for acetylation may be added to the mass. In some instances, it may be desirable to keep the sulphuric acid-containing mass for about 30 to 90 minutes at, say, 35° to 40° C., so as to make possible the realization of cellulose acetate of reduced solution viscosity, as may be desirable when the starting or base cellulose is of comparatively high solution viscosity. The acetylating mixture thus associated with the mass may amount to about 1% to 2% sulphuric acid, 190% to 250% acetic anhydride, and 700% to 800% glacial acetic acid, all based on the dry weight of cellulose. The acetylating reaction goes smoothly to completion at a temperature not over 40° C. and yields cellulose acetate of very good quality even when the reacting mass is very thick and contains, as heretofore, about 12% to 20% cellulose, based on the weight of the entire mixture, that is, cellulose and acetylating reagent.

The foregoing example is subject to modification in various respects. Thus, the glacial acetic acid solution of sulphur dioxide may be admixed with the mass of fiber, especially in the case of cotton, without previous wetting and activation of the fiber with glacial acetic acid. However, the initial wetting and activation of the fiber mass with glacial acetic acid is generally preferred in the case of wood pulp. The glacial acetic acid solution of sulphur dioxide diffuses quickly throughout a mass of fiber that has been prewet and activated with glacial acetic acid. In some instances, less hydrogen peroxide may be added to the fiber than that necessary for complete oxidation of the sulphur dioxide, in which case, residual sulphur dioxide is present during the acetylating reaction. It is usually preferable, however, to add more hydrogen peroxide than that needed for complete oxidation of the sulphur dioxide to sulphuric acid, since sulphuric acid is a far more potent catalyst of acetylation than sulphur dioxide and any excess hydrogen dioxide enhances the color or whiteness of the resulting acetate without leaving any residue thereon. Of course, only part of the sulphuric acid desired as catalyzer in the acetylating reagent might be formed in situ in the mass of fiber to be acetylated and the rest added to the fiber as such at any suitable stage in the process, for instance, along with the acetic anhydride and/or the last portion of glacial acetic acid required in the acetylating reagent.

When the fiber reaches the acetylator in sheet form, for instance, as pulpboard, the portion of glacial acetic acid used for activating the fiber might be sprayed or otherwise applied to the surfaces of the sheet. After a suitable period and temperature of activation, the sheet may be disintegrated or shredded and the resulting mass of activated fiber may be placed in the closed mixing vessel wherein it may be wetted with glacial acetic acid solution of sulphur dioxide and the mixture of glacial acetic acid and hydrogen peroxide and otherwise treated as hereinbefore described. If desired, however, the activating treatment of the fiber with glacial acetic acid and/or the infusion into the mass of fiber of the glacial acetic acid solution of sulphur dioxide and of hydrogen peroxide may be performed with the fiber in sheet form. In order to avoid the obnoxious odor of sulphur dioxide, it may be preferable, as already indicated, to add the glacial acetic acid solution of sulphur dioxide to the mass of fiber as it is being mixed in a closed vessel, particularly as the subsequent acetylating reaction requires the mixing of the fiber with the acetylating reagent and the very same closed mixing vessel as that in which the fiber is treated with the glacial acetic acid solution of sulphur dioxide may serve as the one in which the acetylating reaction is effected.

The process of the present invention may be performed by a sequence of steps other than that hereinbefore given. For instance, the cotton or wood pulp used as raw material may be exposed to an atmosphere of sulphur dioxide gas under conditions such that the fibrous mass will absorb and/or adsorb the desired amount of sulphur dioxide. Into the sulphur dioxide-containing fibrous mass may then be suitably incorporated about 20% to 40% of glacial acetic acid, based on the dry weight of fiber, whereupon the mass may be kept at, say, 40° C., for 2 to 3 hours. Hydrogen peroxide may then be added thereto in the appropriate amount and manner and the mass finally acetylated by the addition thereto of the glacial acetic acid and acetic anhydride necessary to make up the final acetylating reagent.

The order of adding sulphur dioxide and hydrogen peroxide to the fiber may be reversed. Thus, the cellulose fiber may be treated with hydrogen peroxide solution, whereupon glacial acetic acid solution of the sulphur dioxide may be admixed with the fiber, the amounts of hydrogen peroxide and sulphur dioxide thus incorporated throughout the fibrous mass being calculated to form the amount of sulphuric acid desired for catalyzing the subsequent acetylating reaction. The hydrogen peroxide solution may be incorporated throughout the mass of fiber in a mixing vessel so that, when glacial acetic acid solution of sulphur dioxide is then added to the mass, sulphuric acid is formed as the sulphur dioxide penetrates to each fiber unit or wall prewetted with hydrogen peroxide solution. Should the aqueous hydrogen peroxide solution employed be of such dilution as to add an undesirable amount of water to the fiber, the excess water may be evaporated from the fiber. The aqueous hydrogen peroxide solution might be applied to the fiber in sheet form, as by spraying, whereupon the sheet might be partially dried, if desired, and then wetted with the glacial acetic acid solution of sulphur dioxide; or the sheet wetted with hydrogen peroxide solution might be the glacial acetic acid solution of sulphur dioxide in the mixing vessel wherein acetylation is to be performed.

The principles of the present invention may extend to other instances when sulphuric acid may be desired in limited amount substantially uniformly throughout a thick mass of cellulose fiber, for instance, when cellulose fiber is being nitrated or being put through another esterifying reaction catalyzed by sulphuric acid. In nitrating cellulose, it is usually the case that the nitrating acid is used in such excess that it reaches the individual cellulose fibers or fiber walls of the mass being nitrated. The present invention makes possible the reduction in the solution viscosity of cellulose fiber preparatory to its nitration, since part of the sulphuric acid or catalyzing component of the mixed nitrating acid, for instance, a small fraction of such component, may be formed in situ in and throughout the mass of fiber and the mass kept for a sufficient period of time at room or elevated temperature to effect the desired reduction in the viscosity of the fiber, whereupon a mixture of nitric acid and water or a mixture of nitric acid, water, and sulphuric acid may be added to produce nitrating acid of the appropriate composition.

In forming sulphuric acid in situ in a mass of fiber to be nitrated, one does not, as in the case of fiber to be acetylated, have available glacial acetic acid as the carrier for the sulphur dioxide and/or the hydrogen peroxide. However, part of the nitric acid of the nitrating reagent may be used as such a carrier. The sulphuric acid might also be formed in situ in the fibrous mass by placing the fibrous mass in a closed mixing vessel and introducing sulphur dioxide gas and aqueous hydrogen peroxide solution into such container as the mass is being mixed. In such case, such oxidizing gases as ozone may be used as such or dissolved in part of the nitric acid component of the nitrating reagent, in lieu of aqueous hydrogen peroxide. It is to be understood that similar expedients might also be adopted in forming sulphuric acid in situ in a mass of cellulose fiber to be acetylated, especially when the fiber is not to be activated with glacial acetic acid prior to acetylation.

I claim:

1. A process which comprises treating a mass of cellulose with sulphur dioxide gas and then treating the sulphur dioxide-containing mass with hydrogen peroxide.

2. A process of distributing sulphuric acid substantially uniformly throughout a mass of cellulose, which comprises exposing the mass to an atmosphere of sulphur dioxide gas and then oxidizing sulphur dioxide absorbed by the mass to sulphuric acid.

3. A process of distributing sulphuric acid substantially uniformly throughout a mass of cellulose, which comprises exposing the mass to an atmosphere of sulphur dioxide gas and then oxidizing sulphur dioxide absorbed by the mass with hydrogen peroxide to sulphuric acid.

4. A process which comprises exposing a mass of cellulose to an atmosphere of sulphur dioxide gas, oxidizing sulphur dioxide absorbed by the mass to sulphuric acid, and esterifying the mass in the presence of such sulphuric acid.

5. A process which comprising exposing a mass of cellulose to an atmosphere of sulphur dioxide gas, oxidizing sulphur dioxide absorbed by the mass with hydrogen peroxide to sulphuric acid, and esterifying the mass in the presence of such sulphuric acid.

6. A process which comprises exposing a mass of cellulose to an atmosphere of sulphur dioxide gas, oxidizing sulphur dioxide absorbed by the mass to sulphuric acid, and acetylating the mass in the presence of such sulphuric acid.

7. A process which comprises exposing a mass of cellulose to an atmosphere of sulphur dioxide gas, oxidizing sulphur dioxide absorbed by the mass with hydrogen peroxide to sulphuric acid, and acetylating the mass in the presence of such sulphuric acid.

8. In the esterification of a mass of cellulose fiber with esterifying reagent containing sulphuric acid as a catalyst of the reaction, that practice prior to esterification which comprises introducing throughout the mass sulphur dioxide and an oxidant capable of oxidizing the sulphur dioxide to sulphuric acid and thereby to form in situ throughout the mass at least part of the sulphuric acid content of said esterifying reagent, said oxidant leaving practically no residue in the ester prepared from said mass.

9. In the esterification of a mass of cellulose fiber with esterifying reagent containing sulphuric acid as a catalyst of the reaction, that practice prior to esterification which comprises introducing throughout the mass sulphur dioxide and a gaseous oxidant capable of oxidizing the sulphur dioxide to sulphuric acid and thereby to form in situ throughout the mass at least part of the sulphuric acid content of said esterifying reagent.

10. In the acetylation of a mass of cellulose fiber with acetylating reagent containing sulphuric acid as a catalyst of the reaction, that practice prior to acetylation which comprises introducing throughout the mass sulphur dioxide and hydrogen peroxide and thereby to form in situ throughout the mass at least part of the sulphuric acid content of said acetylating reagent.

11. In the acetylation of a mass of cellulose fiber with acetylating reagent containing glacial acetic acid and acetic anhydride as the reactants and sulphuric acid as a catalyst of the reaction, that practice which comprises incorporating throughout the mass at least part of the glacial acetic acid content of said acetylating reagent as a glacial acetic acid solution of sulphur dioxide, incorporating throughout the mass an oxidant capable of oxidizing the sulphur dioxide to sulphuric acid and thereby forming in situ throughout the mass at least part of the sulphuric acid content of said acetylating reagent, said oxidant leaving practically no residue in the acetate prepared from said mass, and adding the rest of the content of said acetylating reagent to the mass to effect the acetylating reaction.

12. In the acetylation of a mass of cellulose fiber with acetylating reagent containing glacial acetic acid and acetic anhydride as the reactants and sulphuric acid as a catalyzer of the reaction, that practice which comprises incorporating throughout the mass at least part of the glacial acetic acid content of said acetylating reagent as both a glacial acetic acid solution of sulphur dioxide and as a mixture with aqueous hydrogen peroxide solution and thereby forming in situ throughout the mass at least part of the sulphuric acid content of said acetylating reagent.

13. In the acetylation of a mass of cellulose fiber with acetylating reagent containing glacial acetic acid and acetic anhydride as the reactants and sulphuric acid as a catalyzer of the reaction, that practice which comprises incorporating throughout the mass at least part of the glacial acetic acid content of said acetylating reagent as both a glacial acetic acid solution of sulphur dioxide and as a mixture with aqueous hydrogen peroxide solution and thereby forming in situ throughout the mass at least part of the sulphuric acid content of said acetylating reagent; and adding the rest of the content of said acetylating reagent to the mass to effect the acetylating reaction.

14. In the acetylation of a mass of cellulose fiber with acetylating reagent containing glacial acetic acid and acetic anhydride as the reactants and sulphuric acid as a catalyzer of the reaction, that practice which comprises wetting and activating the mass of fiber with part of the glacial acetic acid content of said acetylating reagent, again wetting the mass with another part of the glacial acetic acid content of said acetylating reagent as a glacial acetic acid solution of sulphur dioxide, incorporating throughout the mass an oxidant capable of oxidizing the sulphur dioxide to sulphuric acid and thereby forming in situ throughout the mass at least part of the sulphuric acid content of said acetylating reagent, said oxidant leaving practically no residue on the acetate prepared from said mass, and adding the rest of the content of said acetylating reagent to the mass to effect the acetylating reaction.

15. In the acetylation of a mass of cellulose fiber with acetylating reagent containing glacial acetic acid and acetic anhydride as the reactants and sulphuric acid as a catalyzer of the reaction, that practice which comprises wetting and activating the mass with part of the glacial acetic acid content of said acetylating reagent, again wetting the mass with another part of the glacial acetic acid content of said acetylating reagent both as a glacial acetic acid solution of sulphur dioxide and as a mixture with an aqueous hydrogen peroxide solution and thereby forming in situ throughout the mass at least part of the sulphuric acid content of said acetylating reagent, and adding the rest of the content of said acetylating reagent to the mass to effect the acetylating reaction.

GEORGE A. RICHTER.